Sept. 16, 1969   J. OSER   3,467,241

OSCILLATORY WORKING MACHINE

Filed Nov. 3, 1967

INVENTOR.
Jörg Oser

BY

Paul & Paul
ATTORNEYS.

United States Patent Office
3,467,241
Patented Sept. 16, 1969

3,467,241
OSCILLATORY WORKING MACHINE
Jörg Oser, Gleisdorf, Austria, assignor to Binder and Company, Gleisdorf, Austria, a corporation of Austria
Filed Nov. 3, 1967, Ser. No. 680,373
Int. Cl. B65g 27/26, 27/30
U.S. Cl. 198—220                                    4 Claims

ABSTRACT OF THE DISCLOSURE

In a vibratory working machine, such as a trough conveyor, or a sifting trough, or the like, kinetic vibration energy is stored in torsional spring devices which consist of concentrically arranged hollow cylindrical rubber elements, from which metal rings project for alternate connection with the oscillatory troughs and with the guide links which connect the upper and lower decks.

CROSS REFERENCE TO RELATED APPLICATION

This application corresponds to Austrian patent application No. 8A 4690-66 81b, filed in Austria May 18, 1966, by Binder and Company, Rg. Nr. N/10553.

BACKGROUND OF THE INVENTION

Field of the invention

This invention relates to working machines which work on oscillatory principles and in which a pair of conveying or sifting troughs or other masses oscillate in opposite sense and are connected by guides. The troughs or masses are coupled over connecting links containing elastic bodies which serve to store the kinetic energy of vibration.

DESCRIPTION OF THE PRIOR ART

U.S. Patent 2,725,984 granted Dec. 6, 1955 to A. Klemenic, and assigned to Ludwig Binder & Co., Graz-Eggenberg, Austria, is an example of a prior art patent relating to a type of vibratory conveyor which is involved in the present application.

SUMMARY OF THE INVENTION

Oscillatory conveying or sifting machines of the prior art are of such construction as to allow only limited amplitude of oscillation. An increase in conveying and sifting efficiency would be obtained with an increase of the oscillation amplitude. The present invention is directed to the provision of kinetic vibrational energy storage elements from which a greater oscillation amplitude can be exacted.

According to the invention, the improvement in oscillation amplitude is obtained by employing torsional spring elements consisting of several concentrically arranged elements from which connecting projections alternately extend for linkage with the oscillating masses. In the preferred version, the concentrically arranged elements are in the form of hollow cylindrical bodies of rubber, or similar elastic material. The connecting projections are preferably metal rings. The widths (axial dimensions) of the concentric cylindrical bodies are equal but their thicknesses (radial dimensions) are preferably unequal, being progressively less toward the center of the torsional spring device.

DETAILED DISCUSSION OF THE PRIOR ART

Figure 1:
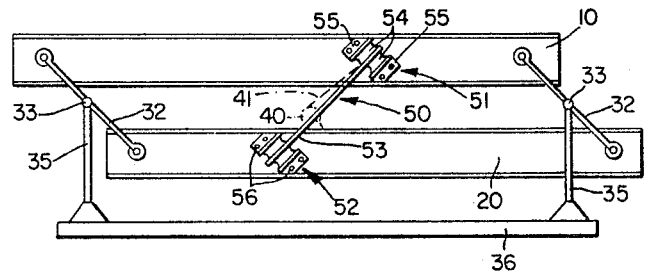
FIG. 1 is a diagrammatic elevational view illustrating a prior art vibratory conveyor or sifting machine.

FIG. 1 illustrates, in simplified diagrammatic form, a typical prior art vibratory machine, such as a sifting screen or conveyor. The machine has an upper deck or trough 10 and a lower deck or trough 20. The troughs are connected to each other on each side by a pair of link arms or guides 32 and the center points of the guides 32 are supported pivotally on cross shafts 33 which are journaled in bearings at the upper ends of standards 35 supported on a base 36.

The troughs 10 and 20 are driven in opposite sense by a known form of eccentric drive 40 shown in dashed line mounted on the lower trough 20 and having a connecting rod 41 connected to the upper trough 10. In a typical case, the eccentric drive 40 may be belt-driven from an electric motor (not shown) mounted on the base 36. The eccentric drive 40 transmits a reciprocating linear motion to the troughs 10 and 20 through the connecting rod 41.

Also connecting the troughs 10 and 20 is an oscillation mechanism 50 comprising the shear-block springs 51 and 52 connected together by the link arm 53. The oscillation mechanism 50 supports no weight. Its function is to oscillate the upper trough 10 against the lower trough 20. Once set in motion, the shear-block springs 51 and 52 keep the troughs oscillating in a natural rhythm by alternately storing and releasing energy. Thus, the motor is required to supply a minimum of power, sufficient only to overcome the losses.

The shear-block springs 51 and 52 are similar. Each consists of a pair of rubber elements 54 bonded to the end of the link 53 and also bonded to metal brackets 55 and 56 bolted or otherwise secured to the troughs 10 and 20. Thus, when the troughs 10 and 20 are pushed apart in opposing sense by the drive connecting rod 41, the link 53 remains motionless, or at least substantially motionless, and the rubber elements 54 of the upper and lower troughs are pulled in opposing sense outwardly relative to the ends of link 53 as the brackets 55 and 56 of the upper and lower troughs move farther apart.

At the end of the outward stroke of the reciprocating rod 41, the troughs 10 and 20 are pulled toward each other by the inward movement of the reciprocating rod 41. The kinetic energy stored in the stretched rubber elements 54 is now released, and this energy contributes substantially to pulling the troughs 10 and 20 toward each other. At the end of the inward stroke of drive rod 41, the rubber elements 54 are stretched in opposing sense, inwardly relative to the ends of the link 53. As a result, when the troughs 10 and 20 are again pushed apart by the outward movement of the drive rod 41, the energy stored in the stretched rubber elements 54 is released and assists in pushing the troughs away from each other. Thus, once the troughs are set in motion by the eccentric drive 40, 41, the shear-block springs 51 and 52 keep the troughs oscillating, alternately storing and releasing energy in a natural rhythm and requiring the drive motor to supply but a minimum of power.

It will be understood that the above is a description of but one side of the machine, the side seen in FIG. 1, and that the other side of the machine is provided with similar supporting, driving and vibrational components.

The foregoing is a description of one form of prior-art construction. In other prior-art constructions, the rubber elements are compressed elements, rather than shearing elements. In still other prior-art constructions, the rubber elements are replaced with steel spring construction. However, rubber elements possess considerable advantage compared with steel spring construction.

A peculiarity of the prior-art constructions and particularly of the rubber shearing elements as illustrated in FIG. 1, lies in the fact that oscillatory conveyor machines having this construction have but limited amplitude of oscillation. An increase in conveying efficiency would, however, be associated with an increase in the oscillation amplitude. The construction provided by the present invention enables a greater oscillation amplitude to be exacted.

DETAILED DESCRIPTION OF THE PREFERRED EMBODIMENTS

Figure 2:
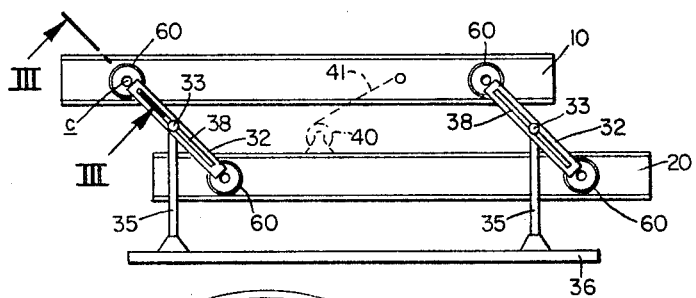
FIG. 2 is a diagrammatic elevational view of a vibratory conveyor or sifting machine embodying the improvement of the present invention.

FIG. 2 is a simplified diagrammatic illustration of a vibratory machine embodying the principles of the present invention. Except for the vibrational mechanism, the machine in FIG. 2 is similar to that in FIG. 1, and like reference numerals have been used on like parts. In FIG. 2, the vibrating mechanism 50 of FIG. 1, including the shear-block springs 51 and 52 and the link 53, is omitted and in lieu thereof torsional spring elements 60 are provided at each end of each of the guide arms 32.

Figure 4:
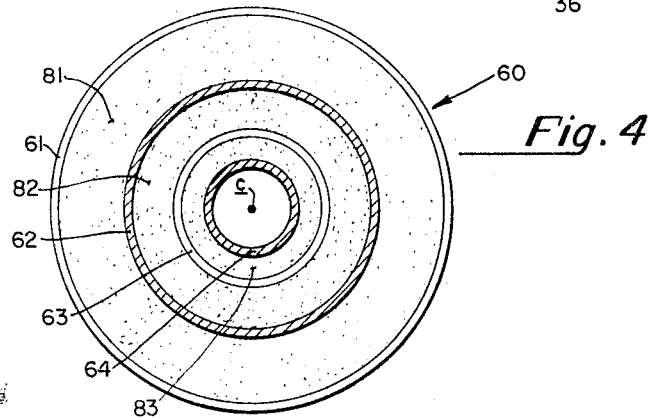
FIG. 4 is a view, in section, of the torsional spring element of FIG. 3, looking along the line IV—IV of FIG. 3.
Figure 3:
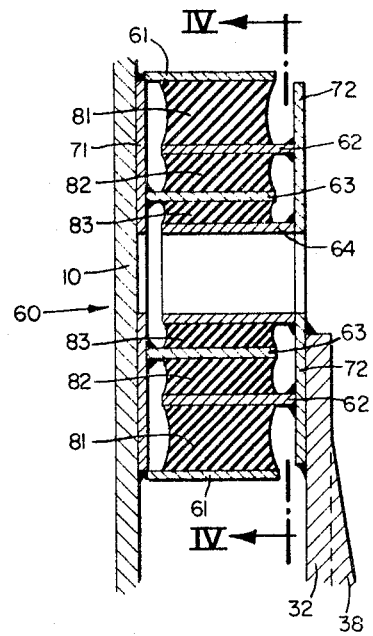
FIG. 3 is a view, in section, looking along the line III—III of FIG. 2 showing one of the torsional spring elements and showing how it is connected to the trough and to the guide link.

While the construction of the torsional spring elements 60 may vary without departing from the basic concept of the present invention, one preferred form of construction is illustrated in the drawing, wherein FIGS. 3 and 4 show the details of the torsional spring device 60 at the upper end of the left guide arm 32 as viewed in FIG. 2. It will be understood that the other torsional spring devices 60 in FIG. 2 are of similar construction.

In FIGS. 3 and 4, the torsional spring element 60 is shown to comprise four concentric rings 61, 62, 63 and 64, preferably steel. The common center c of the four concentric rings lies on the longitudinal axis of the guide arm 32.

As seen in FIG. 3, alternate rings 61 and 63 extend axially inwardly toward the side wall of the trough 10 and are secured as by welding to a flat disk 71 which is welded or otherwise fixed to the side wall of the trough 10. The other alternate rings 62 and 64 extend axially outwardly toward the guide arm 32 and are secured as by welding to a flat disk 72 which is welded or otherwise fixed to the link arm 32. To increase its strength, guide arm 32 is shown as having an integral reinforcing rib 38.

Bonded to the concentric metal rings 61, 62, 63 and 64, and filling the annular spaces therebetween, are three cylindrical rubber rings 81, 82 and 83. In the preferred embodiment, as seen in FIG. 3, the spacing between the successive rings 61, 62, 63 and 64 decreases toward the common center of the concentric structure, and thus the radial thickness of the rubber rings 81, 82 and 83 is progressively less in that order.

In operation, when the upper trough 10 is pushed diagonally upwardly by the drive connecting rod 41 (to the right as viewed in FIG. 2), the lower trough 20 moves diagonally downwardly in an opposing sense (to the left in FIG. 2) and as a consequence the metal rings 62 and 64 move rotationally clockwise (as viewed in FIGS. 2 and 4) relative to the rings 61 and 63 which are fixed to the trough 10. As a result, the cylindrical rubber rings 81, 82 and 83 are placed under torsional stress.

Figure 5:
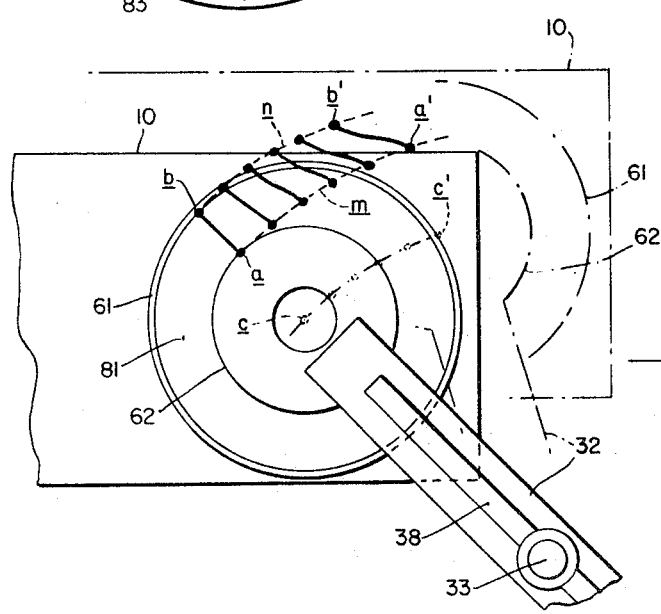
FIG. 5 is a schematic illustration which will be helpful in understanding the torsional action of the spring element.

An understanding of how the rubber cylinders 81, 82 and 83 are placed under torsional stress will be obtained, if not already apparent, by considering the diagrammatic representation in FIG. 5. In FIG. 5, only the two outer rings 61 and 62, and the rubber cylinder 81 which lies therebetween are shown. When the mechanism is in the position shown in solid lines in FIG. 5, the rubber cylinder 81 is under no torsional stress. In this position, the point a on the steel ring 62, and the point b on the steel ring 61, both lie on the axis of the guide arm 32 which pivots about the center axis of the cross shaft 33. When the trough 10 is pushed diagonally upward, by the drive rod 41, to the position indicated in dot-and-dash lines in FIG. 5, the metal rings 61 and 62 move from the solid line positions to the dot-and-dash line positions. Consider now the two points a and b which were on the axis of the guide arm 32 when the rubber cylinder 81 was at rest and under no torsional stress, as is indicated in FIG. 5 by the straight line which connects the points a and b. When the trough 10 moves upwardly to the dot-and-dash line position in FIG. 5, since the ring 62 is secured to the guide arm 32, the point a on the ring 62 moves along the arcuate dotted line m to the position a', the arc m being a portion of a circle whose center point is located at the center axis of the cross shaft 33 about which the guide arm 32 pivots. During this movement of the trough 10, since the ring 61 is secured to the trough 10, the point b on ring 61 moves along the dot-and-dash line n to the point b', the point b' having the same angular relationship to the common center point c' of the concentric ring assembly in its dot-and-dash position as the point b had to the common center c of the concentric ring assembly in its solid line position. Since the rubber element which was bonded to point a has now moved to point a', while the rubber element which was bonded to point b has only moved to point b', it is apparent that the rubber cylinder 81 is placed under torsional stress when the trough 10 moves from the solid line to the dot-and-dash line position in FIG. 5.

When the trough 10 is moved diagonally upward, as just described, the inner two rubber cylinders 82 and 83 are likewise subjected to torsional stress, due to the rotational movement of the rings 62 and 64 relative to the ring 63.

At the end of the upward stroke of the drive rod 41, the kinetic energy stored in the rubber cylinders 81, 82 and 83 is released and assists in the return of the trough 10 to its other or downward limit position. The rings 62 and 64 which are secured to the guide arm 32 now move rotationally in the opposite or counterclockwise direction relative to the rings 61 and 63 which are fixed to the side wall of the trough 10, and when the trough 10 passes through the point of no-stress in the rubber, reprensented in FIG. 5 by the straight-line connection between points a and b, torsional stresses are again set up in the rubber cylinders 81, 82 and 83.

The metal rings 61, 62, 63 and 64 will, in most cases at least, be made of steel, and the rubber cylinders 81, 82 and 83 may be bonded thereto by vulcanizing or by other suitable methods. In some cases, instead of connecting the rubber cylinders to the metal rings by vulcanization, the rubber rings may be pushed in between the rings under pressure and held there by frictional contact.

In another form, each rubber cylinder may have its own inner and outer metal ring to which the rubber is vulcanized, and the concentric torsional spring device may be assembled by inserting the metallic-covered rubber-cylinder units within each other. A rotation-proof connection between the units can be obtained through the interposition of rotation-coupling wedges, or through the development of appropriate section profiles, such as notched section profiles, or similar measures.

It has been ascertained that the invention shown and described herein, permits storing of extraordinarily large amounts of energy within a relatively small number of elements. This permits an economical construction of working machines which operate on the oscillatory principle, while assuring an increase in vibration amplitude in comparison with prior art devices. For example, it has been found that the maximum oscillation amplitude of the improved machine shown in FIGURE 2, may be as much as 100% greater than the maximum amplitude for the prior art machine shown in FIG. 1. This substantial increase in oscillation amplitude is achieved while maintaining unchanged the essential individual parts and total dimensions of the machine. In this way, it becomes possible to increase by approximately 50% the conveyor capacity of the oscillatory machine using essentially the same structure as previously and changing only the vibrational mechanism.

It will be understood that by suitably decreasing the radial thickness of the rubber cylinders as the center of the concentric assembly is approached, the torsional stress in each of the rubber cylinders tends to be more nearly equal. For a given angular movement of the guide arm 32, the angular movement in inches of the rubber which is bonded to the surface of ring 62 is considerably greater than the angular movement in inches of the rubber which is bonded to the surface of the innermost ring 64. Thus, if the radial thickness of the outer rubber cylinder 81 were no greater than the radial thickness of the inner cylinder 83, the torsional stress on the outer rubber cylinder would be much greater than the torsional stress on the inner cylinder. By suitably increasing the radial thickness for the outer rings which move angularly through greater distances (in lineal dimensions), the torsional stress in the various layers tends to be equalized.

What is claimed is:
1. In an oscillatory working machine
   (a) a pair of masses adapted to oscillate in opposite sense,
   (b) guides connecting said masses,
   (c) elastic elements interposed between said guides and said masses for storing kinetic vibration energy,
   (d) said elastic storage elements being in the form of torsional spring devices comprising several concentrically arranged elements,
   (e) connecting projections extending laterally from the concentric elements,
   (f) alternate projections connecting with the mass, and
   (g) other alternate projections connecting with the guides.
2. Apparatus according to claim 1 characterized in that the concentrically arranged elements are hollow cylindrical bodies.
3. Apparatus according to claim 2 characterized in that the hollow cylindrical bodies are of rubber.
4. Apparatus according to claim 3 characterized in that the connecting projections are steel rings.

References Cited

UNITED STATES PATENTS 2,664,995   1/1954   Renner _____ 198—220

RICHARD E. AEGERTER, Primary Examiner